United States Patent [19]

Bateman

[11] Patent Number: 5,166,682
[45] Date of Patent: Nov. 24, 1992

[54] GROUND PROXIMITY WARNING INSTRUMENT UTILIZING GLIDESLOPE MODULATION OF EXCESSIVE DESCENT RATE ENVELOPE

[75] Inventor: Charles D. Bateman, Bellevue, Wash.

[73] Assignee: Sundstrand Corporation, Rockford, Ill.

[21] Appl. No.: 666,094

[22] Filed: Mar. 7, 1991

[51] Int. Cl.$^5$ ............................................. G08B 23/00
[52] U.S. Cl. .................................. 340/970; 340/963; 342/65
[58] Field of Search ................. 340/970, 963, 968; 342/65; 364/428, 433, 427; 73/178 R, 178 T; 244/180

[56] References Cited

U.S. PATENT DOCUMENTS

| | | |
|---|---|---|
| 3,925,791 | 12/1975 | Bateman et al. |
| 3,936,796 | 2/1976 | Bateman. |
| 3,946,358 | 3/1976 | Bateman. |
| 3,947,808 | 3/1976 | Bateman. |
| 3,947,809 | 3/1976 | Bateman. |
| 4,060,793 | 11/1977 | Bateman. |
| 4,215,334 | 7/1984 | Bateman. |
| 4,684,948 | 8/1987 | Bateman ............................. 340/970 |
| 4,947,164 | 8/1990 | Bateman ............................. 340/970 |

FOREIGN PATENT DOCUMENTS

87/01356  3/1987  World Int. Prop. O. ........... 340/970

Primary Examiner—Jin F. Ng
Assistant Examiner—Brent A. Swarthout
Attorney, Agent, or Firm—Fitch, Even, Tabin & Flannery

[57] ABSTRACT

A ground proximity warning system monitors the descent rate of an aircraft and generates a warning if the descent rate is excessive for the current altitude above ground of the aircraft according to a predetermined relationship. The predetermined relationship is altered as a function of the deviation of the aircraft from the glidescope to generate the warning earlier if the aircraft is below the glidescope and later if the aircraft is above the glidescope. The warning is given as a specific aural message indicating the specific flight parameters of the aircraft.

3 Claims, 2 Drawing Sheets

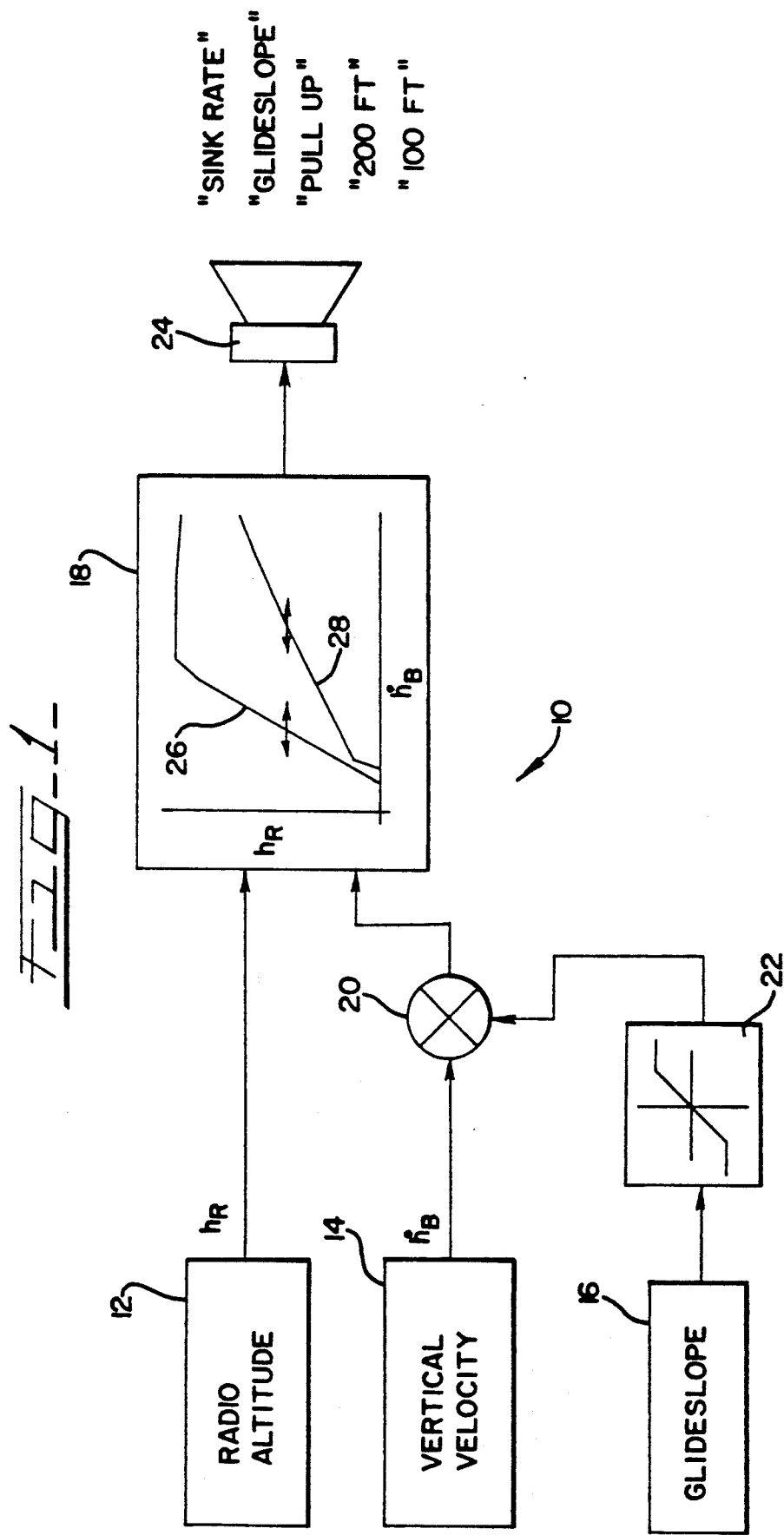

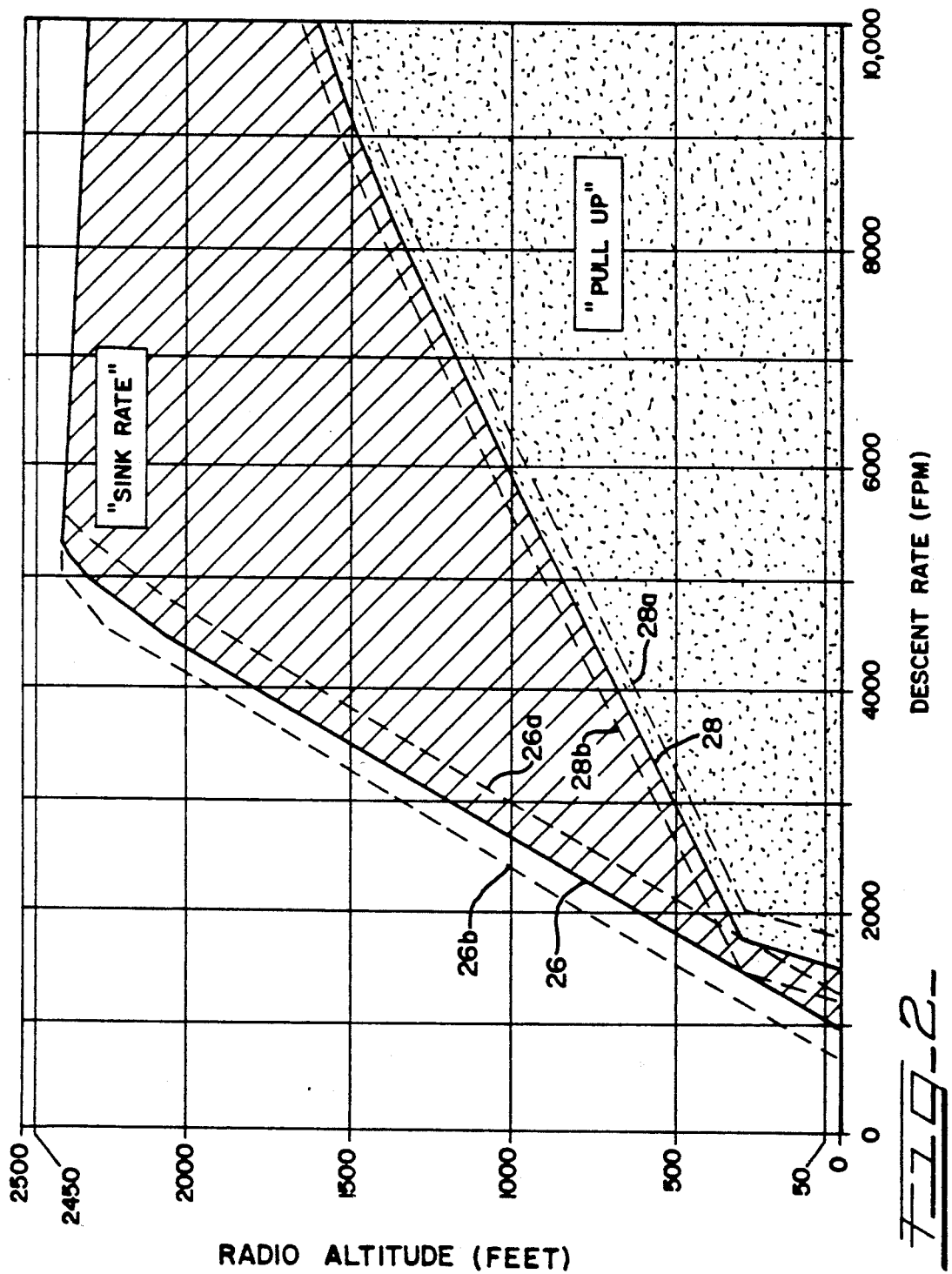

GROUND PROXIMITY WARNING INSTRUMENT UTILIZING GLIDESLOPE MODULATION OF EXCESSIVE DESCENT RATE ENVELOPE

BACKGROUND OF THE INVENTION

1. Field of the Invention

This invention relates generally to ground proximity warning systems, and more particularly to a ground proximity warning system that provides timely alerts and warnings of an excessive descent rate through the glideslope.

2. Description of the Prior Art

Ground proximity warning systems are known. Such ground proximity warning systems advise and warn the pilot of an aircraft of a hazardous flight condition. Among the various hazardous flight conditions are an excessive descent rate, particularly during landing, and examples of warning systems designed to provide warnings of an excessive descent rate during landing are disclosed in U.S. Pat. Nos. 3,936,796, 3,947,808 and 4,060,793. Another hazardous flight condition is the deviation of the aircraft below the glideslope beam. Various warning systems have been developed to warn the pilot of such an excessive deviation below the glideslope beam, and examples of such systems ar disclosed in U.S. Pat. Nos. 3,925,791, 3,946,358 and 3,947,809. While the above systems do provide warnings of the hazardous flight conditions, they are designed to detect, such as excessive descent rate and excessive deviation below the glideslope, they operate independently and monitor only one hazardous flight condition. However, in some instances, a combination of hazardous flight conditions that individually would not pose a hazard to the aircraft can pose a hazard when their effects are combined. Consequently, systems monitoring single flight conditions may not give an optimum warning of a hazardous flight condition resulting from a combination of flight parameters. Conversely, an apparently hazardous flight condition may be tolerated if another flight condition compensates for or negates the hazard. Systems monitoring a single flight condition would be unaware of the compensating condition and could generate nuisance warnings.

SUMMARY

Accordingly, it is an object of the present invention to overcome many of the disadvantages of the prior art systems.

It is another object of the present invention to provide an interactive ground proximity warning system where one set of warning criteria monitoring a first set of flight parameters is modified as a function of another flight parameter.

It is yet another object of the present invention to provide an excessive descent rate warning system whose warning criteria are modified as a function of glideslope deviation, with greater descent rates being allowed before a warning is given when the aircraft is above the glideslope and lesser descent rates being tolerated when the aircraft is below the glideslope.

Thus, in accordance with a preferred embodiment of the invention, there is provided an excessive descent rate warning system that monitors radio altitude and descent rate of the aircraft and generates a warning if the descent rate is excessive for the altitude at which the aircraft is flying is provided. Also provided is a system that monitors the deviation of the aircraft from the glideslope and biases the descent rate signal as a function of glideslope deviation to alter the conditions required to generate a warning so that the warning is generated later if the aircraft is above the glideslope and earlier if the aircraft is below the glideslope. In addition, the system is configured to specify the particular flight conditions causing the warning with the advisory signals indicating whether the problem is excessive descent rate, excessive deviation below the glideslope or a combination of the two. In addition, advisory messages indicating the altitude of the aircraft may also be provided, to help obtain vertical situational awareness for the pilot.

BRIEF DESCRIPTION OF THE DRAWING

These and other objects and advantages of the present invention will become readily apparent upon consideration of the following detailed description and attached drawing, wherein: FIG. 1 is a block diagram of the system according to the invention; and FIG. 2 is a graph showing the warning envelope defining the combination of parameters required to generate an excessive sink rate warning and how the warning envelope is altered as a function of glideslope deviation.

DETAILED DESCRIPTION OF THE PREFERRED EMBODIMENT

Referring to FIG. 1, there is shown a block diagram of the system according to the invention, generally designated by the reference numeral 10. The system according to the invention receives signals from a radio altitude signal source 12, which may be a radio altimeter, a vertical velocity signal source 14, which may be a barometric altitude rate signal or an inertially derived Z-velocity signal, and a glideslope deviation signal source 16, which may be a glideslope receiver. The system also includes a sink rate comparator 18 which receives the radio altitude signal and the vertical velocity signal, the latter through a summing junction 20, and compares the two signals in order to generate a warning if the descent rate of the aircraft is excessive for the altitude at which the aircraft is flying. A Mode I warning system such as the one disclosed in U.S. Pat. No. 4,215,334, incorporated herein by reference may be used as the Model comparator 18. The comparator 18 also receives a glideslope deviation signal from the glideslope signal source 14 via a limiter 22 and the summing junction 20. An annunciator, preferably taking the form of a loud speaker 24, is used to relay any warning or advisory messages to the pilot.

In operation, when no glideslope is present, the system according to the invention operates generally as a Mode I system that compares radio altitude and the sink rate of the aircraft and provides an advisory or a warning if the sink rate is excessive. The envelope of the warning comparator 18 utilizes warning criteria defined by two envelopes 26 and 28. The envelope 26 is an advisory envelope that, if penetrated, causes an advisory message such as, for example, "SINK RATE" to be generated. The envelope 28 is a warning envelope that warns the pilot of a very hazardous condition and, if penetrated, may cause a warning such as "PULL UP" to be generated. The warning envelopes 26 and 28 are illustrated in greater detail in FIG. 2 and will be discussed in a subsequent portion of the specification.

When an aircraft is on an approach to a landing, and the pilot is above the glideslope beam, the pilot may intentionally initiate a high descent rate in order to intercept the glideslope beam. While such a maneuver is not hazardous, it can cause a nuisance warning to be generated by the excessive descent rate warning system. However, if the excessive descent rate persists as the aircraft passes through the glideslope beam, an extremely hazardous flight condition exists, particularly if the aircraft drops below the glideslope beam as a result of the high descent rate. Under such conditions, it is desirable to issue a specific advisory message indicating to the pilot exactly what has happened, and to initiate the advisory message as soon as possible.

In order to provide the dual function of minimizing nuisance warnings when the aircraft is intentionally descending into the glideslope from above and to provide timely warnings when the aircraft is excessively descending below the glideslope, the glideslope deviation signal from the glideslope deviation signal source 16 is used to modulate the vertical velocity signal by applying it to a summing junction 20 via a limiter 22. The limiter 22 limits the amount of glideslope bias that may be applied to the summing junction 20 to a predetermined value, for example ±2 dots. The system is also scaled so that the advisory and warning envelopes 26 and 28, respectively, are shifted to the right or left as indicated by the arrows intersecting the envelope boundaries 26 and 28 by a predetermined number of feet per minute when the limits of the limiter 22 are reached. For example, the system may be scaled so that the advisory and warning envelopes are shifted ±300 feet per minute of vertical velocity over the ±2 dot signal limits of the limiter 22, with the envelopes 26 and 28 being shifted to the right when the aircraft is above the glideslope and to the left when the aircraft is below the glideslope. Consequently, when the aircraft is above the glideslope and the pilot may intentionally be inducing a high descent rate to intercept a glideslope, the envelopes 26 and 28 will be shifted to the right to allow a higher descent rate of up to 300 feet per minute to be attained before a warning is given. Conversely, when the aircraft is below the glideslope, the envelopes 26 and 28 will shift to the left to cause the advisory and warning messages to be generated at descent rates up to 300 feet per minute less than those normally required to generate a warning in order to generate a more timely warning under an extremely hazardous condition.

The shifting of the warning boundaries 26 and 28 are better illustrated in FIG. 2. For example, the boundary 26 is shifted to the location of the boundary 26a and the boundary 28 is shifted to the location of the boundary 28a when the aircraft is above the glideslope to reduce the possibility of a nuisance warning. Similarly, the boundary 26 is shifted to the location of the boundary 26b and the boundary 28 is shifted to the location of the boundary 28b when the aircraft is below the glideslope to provide additional warning time when the aircraft is sinking rapidly below the glideslope.

In a condition where the aircraft is sinking rapidly below the glideslope, it is desirable to provide the pilot with specific information as to the aircraft's vertical situation. Thus, in accordance with another important aspect of the invention, the message generated by the system is varied as a function of the aircraft flight condition. For example, when the aircraft is above the glideslope and descending rapidly, a normal advisory message such as "SINK RATE" can be generated to advise the pilot that he is in a high sink rate condition. If the sink rate condition penetrates the warning boundary 28, then the warning such as the warning "PULL UP" can be generated.

However, if the pilot is below the glideslope and is in a high sink rate condition, it is desirable to advise the pilot of that fact because the pilot may be unaware that he is below the glideslope and that a hazardous condition exists. This can be accomplished by modifying the sink rate message so that the word "GLIDESLOPE" is inserted between the "SINK RATE" announcements to generate a message such as, for example, "SINK RATE, GLIDESLOPE, SINK RATE" to indicate to the pilot that his high sink rate has brought him below the glideslope and that action must be taken. In addition, the radio altitude may be monitored and messages advising the pilot of his altitude may be generated during a sink rate warning occurring below the glideslope which may also be desirable. For example, a call out of "200 FEET, 100 FEET", etc. could be associated with each "SINK RATE, GLIDESLOPE, SINK RATE" message. If the aircraft continued to descend until the warning boundary 28 was penetrated, the "PULL UP" message could be generated.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A ground proximity warning system for aircraft for advising the pilot of a hazardous flight condition during an approach to a landing comprising:
   means for receiving a signal representative of the altitude of the aircraft above ground;
   means for receiving a signal representative of the descent rate of the aircraft;
   means for receiving a signal representative of the deviation of the aircraft from a glideslope beam; and
   means responsive to said altitude above ground representative signal and said descent rate representative signal for generating a warning if the descent rate of the aircraft exceeds a predetermined magnitude that is excessive for the altitude above ground at which the aircraft is flying, said warning means being further responsive to the glideslope deviation representative signal for increasing the magnitude of the descent rate required to generate said warning when the aircraft is above the glideslope.

2. A ground proximity warning system as recited in claim 1 wherein said warning means is further responsive to said glideslope deviation representative signal for reducing the magnitude of the descent rate required to generate a warning when the aircraft is below the glideslope.

3. A ground proximity warning system for aircraft for advising the pilot of a hazardous flight condition during an approach to a landing comprising:
   means for receiving a signal representative of the altitude of the aircraft above ground;
   means for receiving a signal representative of the descent rate of the aircraft;
   means for receiving a signal representative of the deviation of the aircraft from a glideslope beam; and means responsive to said altitude above ground representative signal and said descent rate representative signal for generating a warning if the descent rate of the aircraft exceeds a predetermined magnitude that is excessive for the altitude above ground at which the aircraft is flying, said warning means being further responsive to the glideslope deviation representative signal for reducing the predetermined magnitude of the descent rate required to generate said warning earlier when the aircraft is below the glideslope relative to said warning when the aircraft is not below the glideslope.

* * * * *